Patented Nov. 2, 1937

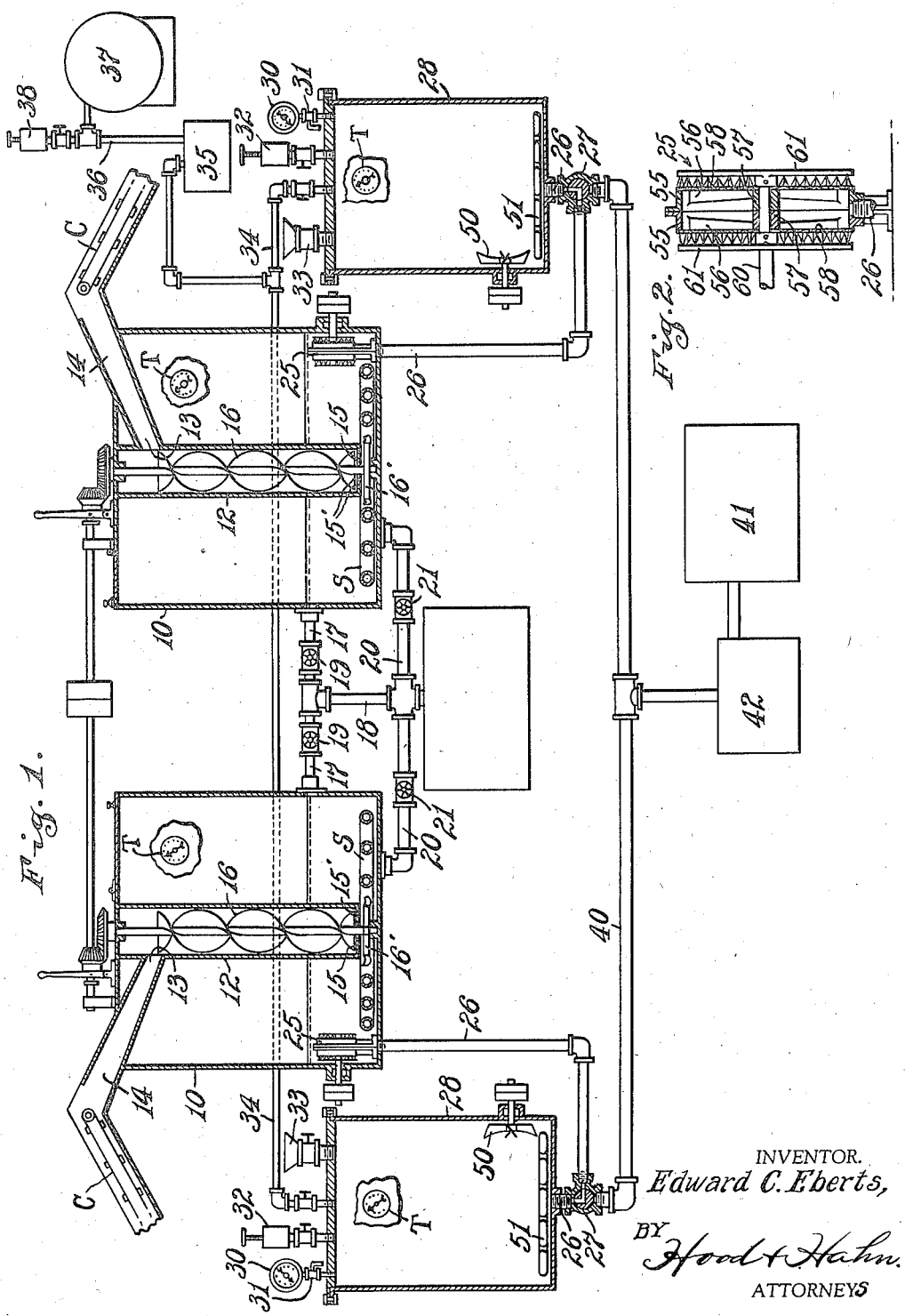

2,097,855

UNITED STATES PATENT OFFICE 2,097,855

APPARATUS FOR PRODUCING TOMATO PRODUCTS

Edward C. Eberts, Jeffersonville, Ind., assignor to Stokely Brothers & Company, Indianapolis, Ind., a corporation of Delaware Original application June 22, 1933, Serial No. 677,110, now Patent No. 1,978,078, dated October 23, 1934. Divided and this application December 18, 1933, Serial No. 702,864

9 Claims. (Cl. 99—239)

Tomato juice intended to be packaged for interstate commerce must, of course, comply with government regulations that it shall be an "unconcentrated pasteurized product consisting of a liquid, with a substantial portion of the pulp, expressed from ripe tomatoes". A product answering to the above definition is not necessarily either stable or as finely flavored as it may be.

It is well known that juices of fresh tomatoes contain vitamins A, B and C and that, when such juices are produced by substantial crushing of the fruit by the usual methods in order to obtain a juice having a commercially acceptable solid content, there is a rapid flavor deterioration and loss of vitamin content, particularly vitamin C, before the juice can be commercially packaged, and that, in many instances, the solid content of the extracted juice has a decided tendency to separate from the liquid.

When tomatoes are crushed the cells, within which the enzymes are naturally sealed, are broken and the freshly liberated enzymes, in the presence of oxygen, apparently very actively and quickly cause or stimulate a change of the pectin to pectic acid and, as a result, a substantial vitamin content appears to be destroyed.

Apparently, also, the development of pectic acid substantially diminishes the ability of the solid content to remain suspended uniformly in the liquid body.

I have discovered a new process for treating fresh tomatoes, the practice of which results in protecting the pectin from substantial change into pectic acid and in thereby preserving a larger proportion of the vitamin content and a substantial elimination of tendency of the solid content to separate from the liquid.

I have also devised new apparatus by means of which my improved process may be practiced on a commercial scale at low cost.

As a result of my newly discovered process the total bulk of pulp (sans skins and seeds if desired) obtainable from a given quantity of raw fruit and available for preservation as pulp or for use in producing catsup, chili sauce, etc., and total bulk of beverage juice (having a commercially acceptable nonseparating solid content) available for packaging, are considerably greater than have been obtainable by previously known processes.

The flavor of both juice and pulp is also decidedly better and more nearly that of the raw fruit, and the vitamin content is more nearly that of the raw fruit.

The increase of available bulk is apparently due to a jellying action attributable to the preservation of the pectin and avoidance of development of pectic acid.

My new process involves, primarily, crushing of each fruit after and during complete submergence in a body of pulp and juice which is maintained at a temperature, (say about 180 to 190 degrees Fahr.) which is sufficiently above normal atmospheric temperatures to discourage enzyme reactions.

My past experience indicates that the most desirable temperature range is below 212 F. and above 150 F.

It is commercially impossible, or impracticable, to avoid all mashing or breaking of the fruit during the necessary preliminary handling in picking, transporting, washing and steaming, but it is advisable to exercise as much care as possible, during these preliminary steps, to avoid rupture of the fruit.

After the fruit has been washed, selected, graded and stemmed, it is promptly submerged in a bath comprising a substantial body of juice and pulp at super-normal temperature, as stated above, whereupon the heated fruit, while still submerged, is crushed by expression through a perforated plate. The bath is preferably continuously stirred and preferably by means which will avoid, as much as practicable, material splashing of the upper surface so as to minimize air absorption.

The temperature of the bath is maintained by added heat.

If desired, the bath during a long run may be maintained at a substantially constant level by overflowing pulp from near the top of the bath and extracting juice from the lower region of the bath, or by concurrent extraction of mixed pulp and juice for ultimate separation elsewhere, but I have found in practice that more accurate and satisfactory results may be obtained by an alternate batch operation which will furnish a substantially uniform supply of pulp (for treatment by a finisher to remove undesired skins, etc.) and beverage juice to be delivered to packaging machines.

Care should be exercised throughout the practice of the process to eliminate, as far as possible, possibility of absorption of air.

The accompanying drawing illustrates, somewhat diagrammatically my new apparatus which has proven to be commercially satisfactory in the practice of my improved method.

Fig. 1 is a general diagram, in the nature of a flow sheet, in partial vertical section, and Fig. 2 is a vertical section of a suitable juice extractor. The term juice is here used to designate a drinkable mixture containing a substantial quantity of tomato solids in finely divided state.

In the drawing 10, 10 indicates two primary vats or tanks of convenient capacity, say 750 gallons, each provided with suitable covers which will permit access to the interior, and with suitable heating means, such as a steam coil S.

Depending into each vat is a tube 12 having near its upper end an inlet 13 adapted to receive fresh fruit from a hopper 14 to which the fruit is delivered by a conveyer C leading from the washing apparatus (not shown). Tube 12 extends to a level near the bottom of the vat and at its lower end is provided with a bottom plate 15 which is perforated by a large number of comparatively small perforations 15' which are preferably funnel shaped.

Rotatably mounted in each tube 12 is a spiral conveyor flight 16 formed to receive the fruit as it arrives through inlet 13, promptly submerge it in the liquid contents of the vat, and carry it to and force it through the perforations 15', thereby reducing the fruit to a mixture of pure juice, a desirable portion of pulp which will remain suspended in the juice, and a remainder of pulp, seeds, and skins (and stems if any), which will rise to the top of the fruit body.

A drain pipe 17 leads from each vat 10, at a level sufficiently above the lower end of tube 12 to insure an adequate depth of bath in the vat for proper submergence of the first-arriving fruit of a succeeding batch, and these pipes 17 conveniently deliver to the pump outflow pipe 18 through valves 19. Each vat is also provided with a supplemental drain 20 which leads through valve 21 to pipe 18 in order that each vat may be completely drained when desired.

Arranged at the bottom of each vat is a juice extractor 25 provided with a discharge pipe 26 which leads, through a three-way valve 27, to a juice tank 28.

For a number of operating reasons I have found that it is apparently better to have a separate juice tank for each of the vats 10 and these juice tanks should be preferably porcelain lined or glass lined. Each juice tank is provided with a cover by which the tank may be hermetically sealed, said cover being preferably provided with a suitable man-hole, not shown, by which access may be had to the interior. Each juice tank 28 is provided with a pressure gage 30, its connection with the tank being conveniently provided with a hand-controlled valve 31. Each juice tank is also provided with a controllable venting valve 32, and is also preferably provided with a valve 33 through which desired condiments may be injected into the tank without substantially breaking the sub-atmospheric pressure which may exist in the tank.

Leading from each juice tank is a pipe 34, the outer end of which is connected to a vacuum chamber 35, preferably having a capacity considerably in excess of the capacity of either juice tank, and connected by a pipe 36 with a vacuum pump 37. An automatic differential 38 is interposed between chamber 35 and pump 37 so as to automatically limit the minus pressure which may be induced in the system.

Leading from each valve 27 is a discharge pipe 40 which leads to a packaging machine 41, either directly or through an homogenizer or viscolizer 42.

Each juice tank 28 is provided with a mechanical stirrer 50 and with suitable heating means, such for instance as the heating coil 51. The vats 10, 10 and tanks 28, 28 are each provided with a suitable thermometer T.

The juice extractor, which I have found to be highly efficient, is illustrated in Fig. 2 and comprises a pair of mating rings 55, 55 having inwardly-extending radial arms 56 which support a central journal bearing 57. The outer end of each ring 55 is covered by a fine screen 58 of approximately 0.023 round openings. These openings are formed as closely as practicable through a metal sheet, approximately 28 gage, unaffected by the juice, such as Monel metal. Journaled in the above-mentioned bearings is a shaft 60 carrying a pair of brushes 61, 61 which engage the outer faces of the screens 58. The shaft 60 is projected through the wall of tank 10 and provided at its outer end with means by which the brushes may be swept over the screens at desired speed to prevent clogging.

The spiral conveyors 16 are provided with suitable driving trains, shown diagrammatically, by means of which they may be driven.

The shaft of each conveyor 16 is extended down through the perforated plate and provided with radially-extending stirrer arms 16' so formed as to act to keep the contents of the vat in constant movement, but without substantial splashing at the upper surface.

The operation is as follows:

Suitable contents of hot tomato pulp and juice having been established in vats 10, 10, fresh tomatoes are delivered to the upper end of the conveyor 16 of one of the vats and by that conveyor promptly submerged in the hot mass and carried thence downwardly and pressed through the perforations 15', the arrangement being such that all substantial breaking of the cells of the fruit takes place only after said cells are submerged in the hot bath.

When the bath has been sufficiently augmented the adjacent tank 28 will be connected to vacuum chamber 35 so that the major quantity of air in that tank 28 will be removed, whereupon the appropriate valve 27 is shifted to connect with the adjacent extractor 25, whereupon the juice, which passes through screens 58, will flow into the appropriate tank 28. In the meantime fresh fruit is fed to the other vat.

I have found in practice that, as the juice passes through screens 58, a vaporization takes place which tends to gas-log the separator, and therefore that maintenance of a desired vacuum, during the transfer time, in tank 28, performs the second function of drawing these vapors away from the interior of the juice extractors, thereby very materially speeding up juice extraction. After a desired quantity of juice, with its entrained solids, has been extracted from tank 10, the appropriate valve 27 is shifted to connect the transfer tank with the filling mechanism, through pipe 40, the appropriate valve 33 is closed to disconnect this juice tank from the vacuum chamber, and the appropriate valve 32 is set so as to break the vacuum in the filled tank 28 sufficiently to permit outflow of the finished juice at a desired rate.

The juice as it flows into the juice tank is stirred and heated so that there is a considerable amount of vaporization which acts to promptly displace any free oxygen which has been in the tank. As a consequence, any absorption of oxygen by the juice in the juice tank is avoided during the period while the tank is being filled. During the period of outflow, air is admitted into the transfer tank but at this time the surface of the content is substantially quiescent and the possibility of air absorption is reduced to negligible amount.

This application is a division from my application Ser. No. 677,110 which has matured into Patent No. 1,978,078.

I claim as my invention:

1. Apparatus for producing tomato products, comprising a vat in which may be maintained a pool of tomato liquor and pulp, means by which said pool may be maintained at a superatmospheric temperature, means within said vat and effective from the maximum level of said pool for receiving successive fresh tomatoes, promptly submerging the same and thereafter, while so submerged, breaking the tomatoes into pulp and released liquor, a discharge conduit leading from the lower part of said vat, a fine screen guarding the said outlet, means for clearing said screen, a container arranged to receive the discharge from said conduit through a normally submerged inlet and means for exhausting air and vapors from said container preliminary to and during flow from the vat into said container.

2. Apparatus for mechanically separating juice and pulp of water-buoyant fruits, such as tomatoes, comprising a tank of substantial depth and capacity, means by which the major contents of said tank may be maintained at a temperature substantially above normal atmospheric temperatures, a tube having external and internal diameters considerably less than the internal diameter of the tank projected downwardly into said tank a multiplicity of fruit diameters below maintainable liquid level in the tank and provided at its lower end with a perforated head, and fruit-engaging-and-forwarding means, mounted in said tube, with its upper fruit-engaging end above the normal maximum level of the buoyant bath contained in the tank and its lower end adjacent said perforated plate.

3. Apparatus for mechanically separating juice and pulp of water-buoyant fruits, such as tomatoes, comprising a tank of substantial depth and capacity, means by which the major contents of said tank may be maintained as a buoyant bath at a temperature substantially above normal atmospheric temperatures, a tube having external and internal diameters considerably less than the internal diameter of the tank with its upper end above the normal maximum level of tank contents and its lower end projected downwardly into said tank a multiplicity of fruit diameters below maintainable liquid level in the tank and provided at its lower end with a perforated head, and a spiral propeller rotatably mounted within said tube with the upper end of its flight above the normal fluid level within the tank and adapted to engage floating fruit and propel the same downwardly in the buoyant bath, and with its lower end adjacent said perforated plate and adapted to force the fruit through said perforated plate.

4. Apparatus for mechanically separating juice and pulp of fruits, comprising a tank of substantial depth and capacity, means arranged within the tank near its lower regions by which juices may be liberated from its pulp, conveyor means arranged within the tank and extending from a point above the normal maintainable liquid level within the tank to said separating means and adapted to propel successive fruits downwardly in the liquid content of the tank to said separating means, and means by which the liquid content of the tank may be maintained at a temperature substantially above normal atmospheric temperatures.

5. Apparatus for mechanically separating juice and pulp of water-buoyant fruits, such as tomatoes, comprising a tank of substantial depth and capacity, means by which the major contents of said tank may be maintained at a temperature substantially above normal atmospheric temperatures, a tube having external and internal diameters considerably less than the internal diameter of the tank with its upper end above the normal maximum level of tank contents and its lower end projected downwardly into said tank a multiplicity of fruit-diameters below maintainable liquid level in the tank and provided at its lower end with a perforated head, and means, mounted in said tube, for receiving such fruit at said maintainable level and propelling the same downwardly in the buoyant bath contained in the tank and through said perforated plate.

6. Apparatus for mechanically separating juice and pulp of water-buoyant fruits, such as tomatoes, comprising a tank of substantial depth and capacity, means by which the major contents of said tank may be maintained as a buoyant bath at a temperature substantially above normal atmospheric temperatures, a tube having external and internal diameters considerably less than the internal diameter of the tank with its upper end above the normal maximum level of tank contents and its lower end projected downward into said tank a multiplicity of fruit-diameters below maintainable liquid level in the tank and provided at its lower end with a perforated head, and a spiral propeller rotatably mounted within said tube with the upper end of its flight above the normal fluid level within the tank and adapted to engage floating fruit and propel the same downwardly in the buoyant bath, and with its lower end adjacent said perforated plate and adapted to force the fruit through said perforated plate.

7. Apparatus for producing tomato products, comprising a vat in which may be maintained a dominant pool of tomato liquor and pulp, means by which said pool may be maintained at superatmospheric temperature, macerating means arranged in the lower region of the vat by which tomatoes may be reduced to juice and pulp, and tomato-engaging-and-forwarding means arranged in the vat with the upper tomato-engaging end above the normal maximum pool level and its lower end in the lower region of the vat adjacent the macerating means, whereby tomatoes delivered to the vat will be promptly submerged in the pool and after and during submergence will be macerated into juice and pulp, and a pulp-restraining juice outlet leading from the lower region of the vat.

8. Apparatus for producing tomato products, comprising a vat in which may be maintained a dominant pool of tomato liquor and pulp, means by which said pool may be maintained at superatmospheric temperature, macerating means arranged in the lower region of the vat by which tomatoes may be reduced to juice and pulp, and tomato-engaging-and-forwarding means arranged in the vat with the upper tomato-engaging end above the normal maximum pool level and its lower end in the lower region of the vat adjacent the macerating means, whereby tomatoes delivered to the vat will be promptly submerged in the pool and after and during submergence will be macerated into juice and pulp, a discharge conduit leading from the lower region of the vat, a fine screen guarding said conduit, and means for clearing said screen.

9. Apparatus for producing tomato products, comprising a vat in which may be maintained a dominant pool of tomato liquor and pulp, means by which said pool may be maintained at superatmospheric temperature, macerating means arranged in the lower region of the vat by which tomatoes may be reduced to juice and pulp, and tomato-engaging-and-forwarding means arranged in the vat with the upper tomato-engaging end above the normal maximum pool level and its lower end in the lower region of the vat adjacent the macerating means, whereby tomatoes delivered to the vat will be promptly submerged in the pool and after and during submergence will be macerated into juice and pulp, a discharge conduit leading from the lower region of the vat, a fine screen guarding said conduit, and means for clearing said screen, and a container arranged to receive the discharge from said conduit through a normally submerged inlet.

EDWARD C. EBERTS.